United States Patent [19]

Martinelli

[11] 4,280,545
[45] Jul. 28, 1981

[54] WIRE ROPE TRACTION DEVICE FOR TIRES
[75] Inventor: René J. Martinelli, Tigard, Oreg.
[73] Assignee: Burns Bros., Portland, Oreg.
[21] Appl. No.: 3,273
[22] Filed: Jan. 15, 1979
[51] Int. Cl.³ .............................................. B60C 27/00
[52] U.S. Cl. ................................ 152/222; 24/68 TT; 24/71 TT; 24/129 W; 24/363; 152/221; 152/242; 403/407
[58] Field of Search ............... 152/222, 221, 219, 233, 152/239, 242, 170, 172; 403/407, 284; 104/115, 200, 201; 248/505; 238/14; 24/68 CT, 68 TT, 68 E, 69 TT, 71 CT, 70 TT, 73 AC, 73 CE, 73 BH, 73 SA, 73 A, 73 BS, 73 MC, 71 TT, 115 A, 115 G, 122.3, 129 B, 129 W, 201 HE, 248 R

[56] References Cited
U.S. PATENT DOCUMENTS

| 870,657 | 11/1907 | Woodworth | 152/222 |
|---|---|---|---|
| 1,185,084 | 5/1916 | Gahan | 152/221 |
| 1,424,347 | 8/1922 | Evans | 152/242 X |
| 2,571,020 | 10/1951 | Earl, Sr. | 152/222 X |
| 2,637,363 | 5/1933 | Perlman | 192/213 R |
| 3,085,614 | 4/1963 | Rozanski | 152/239 X |
| 3,111,155 | 11/1963 | Roland | 152/239 |
| 3,796,461 | 3/1974 | Cucheran | 24/201 HE X |
| 3,898,713 | 8/1975 | Nelson et al. | 24/73 SA |
| 4,155,389 | 5/1979 | Dwinell | 152/221 |

Primary Examiner—William A. Powell
Assistant Examiner—Thomas Bokan
Attorney, Agent, or Firm—Klarquist, Sparkman, Campbell, Leigh, Whinston & Dellett

[57] ABSTRACT

A wire rope traction device for tires, and particularly radial tires, includes lateral cables and a plurality of cross cables for extending between the lateral cables across the sole of a tire. Flat metal members secured to the lateral cables and ends of the cross cables form low profile articulated connections therebetween substantially adjacent the sole of the tire and radially outwardly from the tire sidewall flexing point for enabling a tighter grip on the tire by the traction device.

22 Claims, 5 Drawing Figures

WIRE ROPE TRACTION DEVICE FOR TIRES

BACKGROUND OF THE INVENTION

The present invention relates to wire rope traction devices for tires and particularly to an improved wire rope traction device which can be easily accommodated in a small space and which is particularly useful in connection with radial tires.

Recent model automobiles are characterized by reduced clearance in fender wells making the use of conventional tire chains difficult or impossible. Furthermore, tires are not constant in shape but flex to a considerable extent, especially when bearing the weight of a vehicle. Even previously known lightweight cable chains are apt to rub on the sides of the fender wells resulting in damage to the vehicle and the tire, particularly as a result of looseness of the tire chains.

Cable tire chains of the prior art are similar in general configuration to conventional tire chains formed entirely of chain links wherein a lateral member is provided on each side of the tire proximate the wheel rim while cross links extend around the sidewall of the tire and across the tire sole or tread for making frictional contact between the tire and the road surface. Thus, a considerable portion of a cross link or cross cable assembly is actually adjacent the sidewall of the tire and is apt to scrape between the tire sidewall and the vehicle fender well. This is particularly true of radial tires. Since the lateral members or lateral cables are positioned radially inwardly toward the metal wheel rim, they also exercise somewhat limited influence in holding the tire chain in place inasmuch as the lateral members themselves may not be held against the tire but rather contribute to sideways movement toward the fender well or other portions of the vehicle. Lateral cables have not heretofore been located radially farther outwardly because of the lack of a durable, flexible and low profile means for attaching the cross links or cross cables to the lateral cables.

When employing radial tires, the cross links or cross cables of a cable tire chain are apt to exhibit radial throw-out wherein the cross links or cross cables are thrown outwardly by centrifugal force, e.g. at the top of the tire when the tire is compressed at the bottom due to weight of the vehicle. The overall configuration of the tire chain tends to be such as to accommodate radial tire bulge and results in a slackening of the lateral members or cables at the side of the tire near the top, thereby loosening the cross links or cables enabling them to be propelled outwardly by centrifugal force. Of course, this results in undesired wear and damage between the tire and the vehicle fender well.

SUMMARY OF THE INVENTION

In accordance with a preferred embodiment of the present invention, a wire rope traction device includes a pair of lateral cables and a plurality of cross cables for extending across the sole or tread of a tire between the aforementioned lateral cables. A plurality of lateral cable securing members are disposed at spaced points along each lateral cable, while a plurality of cross cable end connector members are joined to ends of the cross cables, with each said cross cable end connector member making an articulated connection with a said lateral cable securing member. The respective members are preferably formed of flat metal material having a low profile and are positioned by the cross cables in adjacent relation to the sole of the tire, with said articulated connections being closer to the sole of the tire than to the rim of a wheel upon which the tire is mounted. The flat metal members form a durable connection providing a hinging action adjacent the sole of the tire and position the entire configuration, including the lateral cables, closer to the sole of the tire, instead of locating the same on the inner side of a tire sidewall flexing point or bulge. Thus, the traction device may be likened to a tight fitting "cap" located closely and tightly adjacent the tire periphery, and is found to "hug" the tire closely without producing undesired movement of the lateral cables or cross cables, radial throw-out, and undesired wear. The freely hinging action of the articulated connections is found to provide adequate flexibility to accommodate flexure of the tire without also producing slap or excessive movement of the overall device, and the present device is found to have particular advantage in connection with radial tires.

It is accordingly an object of the present invention to provide an improved traction device for tires which is held in close contact with the contour of a tire.

It is a further object of the present invention to provide an improved traction device for tires adaptable for use with radial tires which is less subject to radial throw-out.

It is another object of the present invention to provide an improved traction device for tires which is less apt to damage a tire or the vehicle upon which the tire is mounted than models heretofore proposed and employed.

It is a further object of the present invention to provide an improved traction device for tires having an enhanced hinging action adjacent the periphery of a tire for accommodating changes in tire contour without sacrificing durability or peripheral positioning of the tire chain.

It is a further object of the present invention to provide an improved traction device for tires of lower weight than tire chains heretofore employed.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
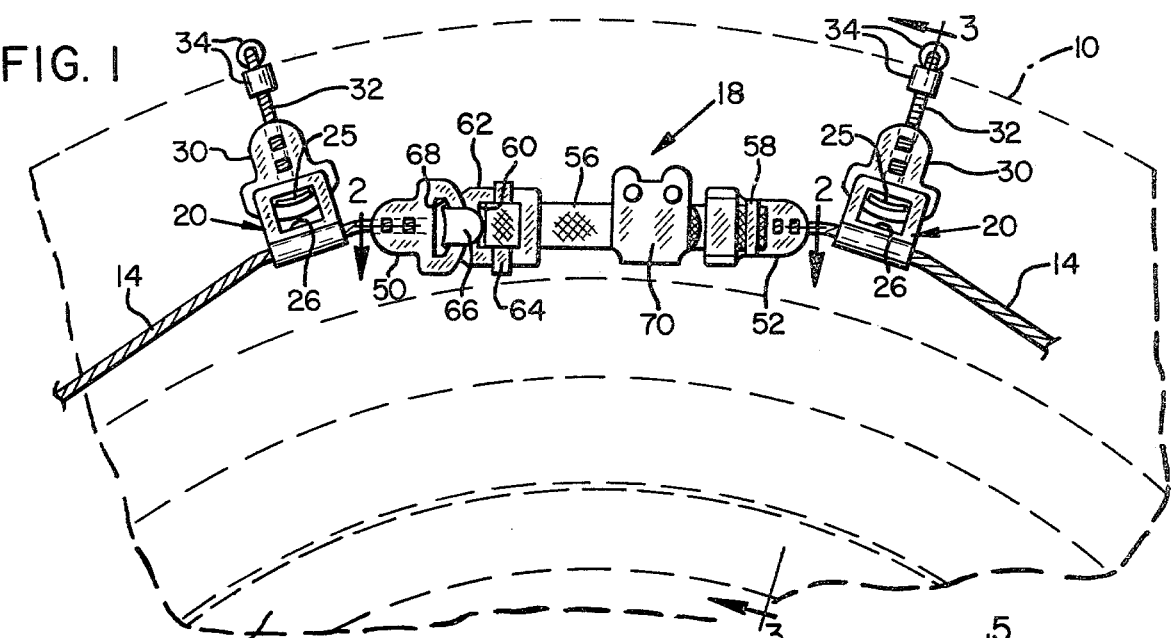
FIG. 1 is an elevational view, partially broken away, of a traction device according to the present invention as mounted upon a tire indicated in dashed lines.
Figure 3:
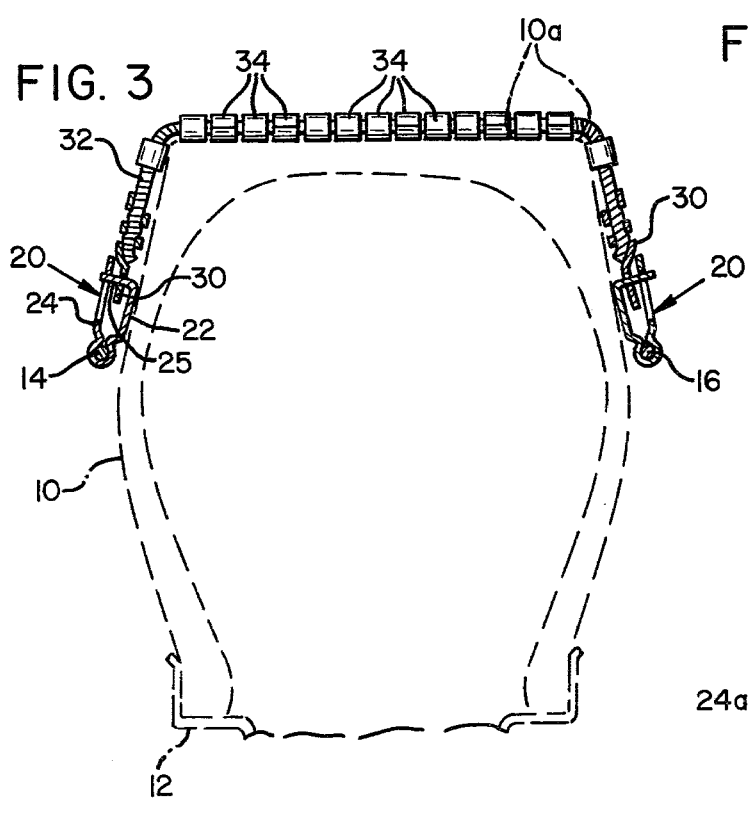
FIG. 3 is a cross-sectional view taken at 3—3 in FIG. 1.
Figure 5:
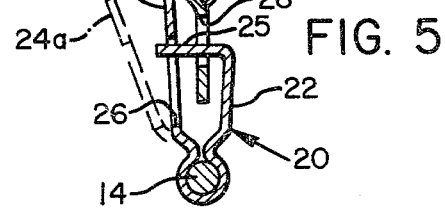
FIG. 5 is a cross-sectional view of the FIG. 4 articulated connection taken at 5—5 in FIG. 4.

Referring to the drawings, a wire rope traction device according to the present invention is illustrated as secured upon a tire 10, indicated by dashed lines, mounted upon a wheel 12 the rim of which is also illustrated in dashed lines in FIGS. 1 and 3. The traction device includes lateral wire ropes or cables 14 and 16 which extend circumferentially about the sidewalls of the tire, being joined at their respective ends by means of a belt attachment, for example the belt arrangement 18 as illustrated in FIG. 1. Each of the lateral cables is provided at spaced points with flat metal clamping straps 20, each of which is crimped around the lateral cable to form a first side 22 and a second facing side 24 in facing parallel relation to the sidewall of the tire 10. The first side of the cable clamping strap is bent over to form a tongue 25 extending substantially perpendicularly away from the sidewall of the tire, while side 24 is apertured at 26 and receives the tongue in securing relation such that the tongue is not easily distorted by tension from the illustrated configuration. Moreover, each tongue is also received through an aperture 28 in a flat metal, spade-shaped, cross link anchor 30 secured to the end of a cross wire rope or cable 32, and the closed loop configuration of the cable clamping strap 20 prevents disengagement between members 20 and 30. In forming the articulated connection, the tongue 25 is first inserted through the aperture 28 as illustrated in FIG. 5, at which time side 24 is in the position illustrated in dashed lines at 24a. Then, side 24 is closed toward side 22 while the cable 14 is crimped between the sides. The tongue 25 will then extend slightly through the upper portion of aperture 26 as shown.

Figure 4:
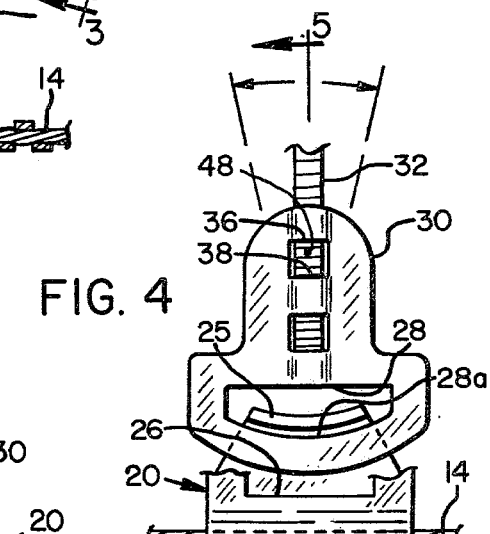
FIG. 4 is a broken away view of a pair of articulated connecting members positioned between lateral cables and cross cables of the traction device according to the present invention.

The upper portion of the cross link anchor is doubly slit as at 36 and 38 in FIG. 4, and the portion 40 between the slits is depressed so as to receive the cable 32 for crimping the cable against the back of the anchor 30. This configuration is suitably repeated as illustrated in FIGS. 4 and 5, and it is seen the crimping of sections 40 and 42 against the cable 32 produces an S-shaped cable configuration. The cable tends to be bent in the direction away from the back of the cross link anchor, i.e. toward the tire. However, the flexibility of the cable is retained by this crimping arrangement.

Cross cables 32 extend over the sole 10a of the tire 10, i.e. where the tire tread is located, between aligned cable clamping straps 20, a cross link anchor 30 being secured at each end of each cross cable for engaging a corresponding clamping strap in the manner hereinbefore described. Cable 32 is suitably multistrand steel cable covered by a helically wound flat steel strip, the turns of which are spaced slightly so the cable remains flexible. Around the exterior of the cable 32 are received a plurality of cylindrical steel sleeves 34 adapted for engaging the road surface and which are able to slide or rotate with respect to the cable 32.

The tongue 25 of each clamping strap 20 is received through an aperture 28 in a cross link anchor 30, as described above, in non-binding relation so as to provide an articulated or hinging connection between members 20 and 30. Although both members 20 and 30 are formed of flat metal and are disposed substantially flat against the corresponding tire sidewall, sides 22 and 24 of clamping strap 20 are spaced far enough apart so as to provide for limited sliding movement of anchor 30 along tongue 25 in a direction perpendicular to the tire sidewall to enable a considerable hinging movement as illustrated by arrows 44 and 46 in FIG. 5. The principal hinging movement for anchor 30 is in the direction of arrow 44, i.e. toward the tire sidewall for accommodating the changing contour of the tire. Thus, as the sidewall flexes, for example as it contacts the road and receives the pressure of the vehicle, the joint between members 20 and 30 formed between tongue 25 and aperture 28 will also flex while retaining close hugging contact with the tire.

The aperture 28 in anchor 30 is elongate in a direction circumferential of the tire and likewise the cross section of tongue 25 is elongate in the same direction to provide a strong connection. However, tongue 25 is shorter in such direction than aperture 28 to allow for relative sideways movement between the members 20 and 30. Both the lower edge 28a of aperture 28 and the cross section of tongue 25 engaged thereby are curvilinear with respect to a center of curvature, e.g. at 48, disposed upwardly along cross cable 32. Thus, the curved engaging surfaces permit sliding movement therebetween and possible angular disposition of cross cable 32 relative to lateral cable 14 in the plane of the sidewall as may occur in mounting the chain or in movement of the chain during use, without requiring bending of the cross cable as could cause cable failure. Also, this configuration prevents binding as might otherwise prevent flexure of the articulated joint with flexure of the sidewall of the tire. Therefore, a stable cable engaging joint which is fully articulated in two directions is provided at the tire sidewall adjacent the sole of the tire, said joint being formed of substantially flat members which require a minimum of clearance adjacent the tire sidewall and which are structurally strong and wear resistant.

According to an advantageous construction of the present invention, the cross cables 32 position members 30 and 20 as well as the lateral cables 14 and 16 secured thereby in relatively close spaced relation to the sole 10a of the tire. The lateral cables 14 and 16 are placed about two inches from the tread, i.e. just outside the sidewall flexing point or bulge of radial tires. The articulated connections, i.e. at each joint provided between a tongue 25 and a slot 28, are located substantially closer to the sole of the tire than to the rim of the wheel upon which the tire is mounted, and these articulated connections adjacent the sole of the tire provide hinging action with flexure of the tire at this point as well as the necessary durability as hereinbefore mentioned. The configuration results in a tighter gripping action between the overall tire chain and the tire, since being located substantially outside the major flexing point of the tire and forming a tight "cap" around the tire periphery. The cable configuration does not have to accommodate as great a change in tire shape as prior chain configurations, and consequently is not as loose and does not execute as much sideways movement with bulge of the tire. Radial throw-out of the cross cables or cross links is minimized, e.g. at the top of the tire when the bottom of the tire is being compressed due to weight of the vehicle. The present cross cables are shorter, are held closer, and are not slackened as a result of accommodating radial tire bulge. Tire chain wear and wear of the tire and vehicle fender well are lessened as the chain more tightly and consistently adheres to the tire. This "raising" of the lateral chains 14 and 16 toward the sole of the tire and the consequent tightening of the tire chain with respect to the tire is made possible by the sturdy and flat articulated joint formed by members 20 and 30, which can be positioned substantially adjacent the sole or tread of the tire and which can withstand severe conditions without failure. Not only does the flexible joint provided by members 20 and 30 enable a more peripherally located cable tire chain, but also the members themselves are substantially flat or low profile, being closely spaced against the tire sidewall so as to be well accommodated in the clearance provided between the tire and the fender wells of modern automobiles. As a further advantage of the present invention, the overall weight of the tire chain is reduced.

Figure 2:
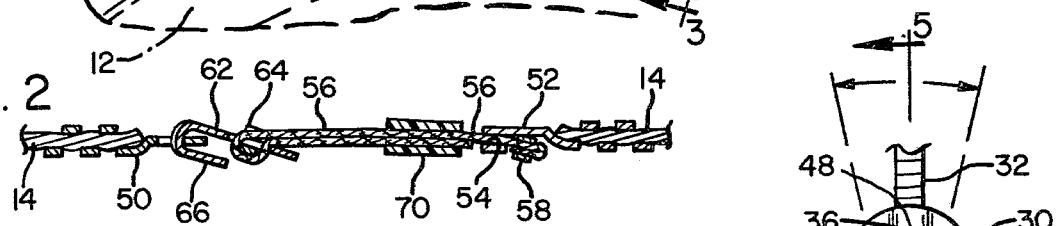
FIG. 2 is a cross-sectional view taken at 2—2 in FIG. 1 illustrating a belt arrangement for securing the traction device in place.

As hereinbefore mentioned, each of the lateral cables 14 and 16 is provided with a belt attachment 18 for securing the respective ends thereof together as when mounting the traction device upon a vehicle tire. A first end of a lateral cable, for example cable 14, is secured by crimping the same through slots in a lateral cable anchor 50 which is conveniently the same in construction as the cross link anchors 30. The opposite end of the same lateral cable 14 is secured as by crimping through slots in a clamp 52 provided with a longitudinal aperture 54 at the end thereof remote from the cable 14 connection, said aperture receiving a webbed belt 56 therethrough which is doubled and held by means of an enclosing metal fitting 58. The opposite end of the belt 56 passes through an aperture 60 in a hooked buckle 62, and around a slide bar 64, before passing back through the aperture. Buckle 62 includes a hook 66 for engaging the aperture 68 of anchor 50. The belt is conveniently drawn up tightly, as illustrated in FIGS. 1 and 2, such that the belt is tightly engaged between slide bar 64 and the edge of aperture 60. The loose end of the belt is secured against flapping by means of a plastic clasp 70 which snaps together and secures the belt end. The releasable hook 66 cooperating with aperture 68 facilitates rapid attachment of the traction device to a tire, for example on the inside of the tire, without readjustment of the overall belt each time the traction device is mounted on a tire. Of course the hook also makes possible quick release of the traction device.

Although the traction device according to the present invention is particularly adapted for use on radial tires, it can be employed on tires of other types as well.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a traction device for attachment to a tire mounted on a wheel, including a pair of lateral cables for positioning circumferentially about the sidewall of said tire and a plurality of cross cables extending over the sole of said tire between said lateral cables, a plurality of joints between said lateral cables and said cross cables, each such joint comprising:
    a lateral cable securing member attached to a said lateral cable, said securing member being substantially flat for positioning against the sidewall of said tire,
    and a cross cable end connector member joined to an end of a said cross cable, said connector member also being substantially flat for positioning against the sidewall of said tire,
    one of said members having a tongue and the other member having an aperture in a flat side thereof through which said tongue extends to provide an articulated connection,
    wherein said one member forms a substantially closed loop comprising first and second flat sides extending to said tongue.

2. The traction device according to claim 1 wherein said aperture and said tongue are elongate in a direction substantially circumferential of said tire.

3. The traction device according to claim 2 wherein said aperture is longer than said tongue in said direction substantially circumferential of said tire.

4. The traction device according to claim 3 wherein said tongue and the aperture edge engaged thereby are curvilinear with respect to a center of curvature toward the connected cross cable.

5. The traction device according to claim 1 wherein the said one member has a second aperture for receiving said tongue after said tongue passes through the first mentioned aperture.

6. The traction device according to claim 1 wherein said cross cable end connector member is crimped onto the end of a said cross cable.

7. A traction device for attachment to a tire mounted on a wheel, comprising:
    a pair of lateral cables for positioning circumferentially about the sidewall of said tire,
    a plurality of cross cables for extending over the sole of said tire between said lateral cables,
    a plurality of flat metal cable clamping straps secured at spaced points to each said lateral cable,
    and a plurality of flat metal cross link anchors joined to either end of each said cross cable,
    said cable clamping straps extending around a said lateral cable to receive said lateral cable while forming two sides joined by a tongue positioned in spaced relation to said lateral cable,
    each said cross link anchor having an aperture receiving the tongue of a said clamping strap in non-binding relation to provide a flexible joint.

8. The traction device according to claim 7 wherein said aperture and said tongue are elongate in a direction substantially circumferential of said tire.

9. The traction device according to claim 8 wherein said tongue and the aperture edge engaged thereby are curvilinear with respect to a center of curvature toward the connected cross cable.

10. The traction device according to claim 7 wherein said cable clamping straps each have a second aperture on one side thereof, with said tongue being bent over from the other side thereof and being received in said second aperture after passing through the first mentioned aperture.

11. A traction device for attachment to a vehicle tire, comprising:
    a pair of lateral cables adapted to extend circumferentially about each side wall of said tire in a position closer to the sole of the tire than to the rim of the wheel on which the tire is mounted,
    a plurality of cross cables for extending across the sole of said tire,
    and a plurality of metal members connecting the ends of said cross cables to said lateral cables,
    each said metal member being formed from a sheet metal strip doubled so as to form a pair of generally parallel spaced sides, a said lateral cable being positioned in the bight of a member with said sides extending toward the sole of a tire and crimped adjacent the cable to secure the member thereto, the side of said member next adjacent the surface of a tire being bent outwardly substantially at a right angle to provide a tongue portion, the opposite side of said member having an aperture therein through which tongue portion extends when said sides are parallel, said opposite side being capable of being bent outwardly sufficiently to a position wherein said opposite side clears said tongue portion, said tongue portion being curvilinear with respect to a center of curvature toward the sole of a tire, each said cross cable having a pair of cross cable anchors secured one to each of the ends thereof, each cross cable anchor being formed from a flat metal sheet and comprising a first, flat, portion extending between said member sides and having a curvilinear aperture complementary to said tongue portion and receiving said tongue portion, and a second cable clamping portion crimped to an end of a said cross cable, said anchor aperture being of greater length and width than said tongue portions thereby permitting articulation of an anchor member relative to the metal member to which it is connected, and means on each of said lateral cables for clamping said cables snugly against the tire side walls.

12. A traction device for attachment to a tire mounted on a wheel, comprising:

a pair of lateral cables for extending circumferentially about each sidewall of said tire, and a plurality of cross cables extending across the sole of said tire between said lateral cables and being provided with road engaging means, a plurality of flat metal lateral cable securing members disposed at spaced points along each of said lateral cables, and a plurality of flat metal cross cable end connector members joined to ends of said cross cables, each said cross cable end connector member making an articulated connection with a said lateral cable securing member, wherein one of said members of the pair of articulated members has a bent over tongue portion and the other member of the pair of articulated members has a tongue receiving aperture through which said tongue portion extends in non-binding relation permitting articulation, said aperture being elongate in a direction along the circumference of said tire and said tongue portion also being elongate in cross section along an edge of said aperture in engaging relation with said tongue portion, said aperture being longer than said tongue portion in said direction, and wherein said lateral cables, said securing members and said connector members are positioned by said cross cables in adjacent relation to the sole of said tire locating said articulated connections closer to the sole of said tire than to the rim of a wheel upon which said tire is mounted, said articulated connections hinging with flexure of the tire sidewall.

13. The traction device according to claim 1 wherein said tongue portion and the aperture edge engaged thereby are curvilinear with respect to a center of curvature toward the connected cross cable.

14. The traction device according to claim 1 wherein said one of said members also has a side portion having a second aperture for receiving said tongue portion after said tongue portion passes through the first mentioned aperture.

15. The traction device according to claim 5 wherein said one of said members is crimped around said lateral cable with a side extending to form said tongue portion opposite said side portion having said second aperture.

16. The traction device according to claim 1 wherein said cross cable end connector members are crimped onto ends of said cross cables.

17. A traction device for attachment to a tire mounted on a wheel, comprising:

a pair of lateral cables for positioning circumferentially about the sidewall of said tire, a plurality of cross cables extending over the sole of said tire between said lateral cables and being provided with road engaging means, a plurality of flat metal cable clamping straps secured at spaced points to each said lateral cable, and a plurality of flat metal cross link anchors joined to either end of each said cross cable, each anchor making an articulated connection with a said cable clamping strap to provide a substantially flat articulated joint, each said cable clamping strap being crimped around said lateral cable to provide two spaced sides in facing relation, one of which is bent over at the end to form a tongue and the other being apertured to receive said tongue, and each said cross link anchor also having a tongue receiving aperture and being positioned between the said sides of said cable clamping strap in non-binding relation therewith to provide said articulated connection, wherein said lateral cables, said clamping straps and said anchors are positioned by said cross cables to locate said articulated connections closer to the sole of said tire than to the rim of the wheel upon which said tire is mounted.

18. The traction device according to claim 8 wherein said aperture in said cross link anchor is elongate in a direction along the circumference of said tire, said tongue also being elongte in cross section along an edge of said aperture in said cross link anchor in engaging relation with said tongue, said aperture in said cross link anchor being longer along said edge than the cross section of said tongue.

19. The traction device according to claim 18 wherein said tongue and the edge of the aperture in said cross link anchor engaged thereby are curvilinear with respect to a center of curvature toward the connected cross cable to permit rotational sliding movement between said tongue and said aperture as well as hinging action toward and away from said tire.

20. The traction device according to claim 17 wherein said flat metal cross link anchor is spade-shaped with the upper portion thereof being doubly slit to receive the end of a cross cable therethrough and being crimped to curve said cross cable toward the sole of said tire.

21. The traction device according to claim 17 wherein ends of said lateral cables are joined together by adjustable belts.

22. The traction device according to claim 21 wherein a said belt is joined to a said lateral cable by means of a releasable hook.

* * * * *